United States Patent

Schmidt

(10) Patent No.: US 10,140,203 B2
(45) Date of Patent: Nov. 27, 2018

(54) METHOD AND APPARATUS FOR DYNAMICALLY ANALYZING THE CORRECTNESS OF SOFTWARE

(71) Applicant: Siemens Aktiengesellschaft, Munich (DE)

(72) Inventor: Adriaan Schmidt, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 105 days.

(21) Appl. No.: 15/247,494

(22) Filed: Aug. 25, 2016

(65) Prior Publication Data

US 2017/0068611 A1 Mar. 9, 2017

(30) Foreign Application Priority Data

Sep. 7, 2015 (DE) .................... 10 2015 217 074

(51) Int. Cl.
G06F 11/36 (2006.01)
(52) U.S. Cl.
CPC ............... *G06F 11/3636* (2013.01)
(58) Field of Classification Search
CPC ........... G06F 11/3604; G06F 11/3636; G06F 11/3688; G06F 11/3692
USPC ................. 717/124–135; 714/37, 38.1
See application file for complete search history.

(56) References Cited

U.S. PATENT DOCUMENTS

| 4,435,759 A | 3/1984 | Baum et al. ............... 714/44 |
| 5,966,541 A * | 10/1999 | Agarwal ............... G06F 8/52 717/128 |
| 8,381,192 B1 * | 2/2013 | Drewry ............ G06F 11/3624 712/233 |
| 8,910,124 B1 * | 12/2014 | Bhansali ............ G06F 11/3612 717/127 |

(Continued)

FOREIGN PATENT DOCUMENTS

DE 102009004726 A1 7/2009 ............. G06F 11/28

OTHER PUBLICATIONS

German Office Action, Application No. 102015217074.8, 8 pages, dated Mar. 24, 2016.

*Primary Examiner* — Qing Chen
(74) *Attorney, Agent, or Firm* — Slayden Grubert Beard PLLC

(57) ABSTRACT

A method is provided for dynamically analyzing the correctness of software. A central processing unit of a target system has a trace interface that provides coded raw data relating to the tracing of the processing unit. The raw data are processed by initially conditioning the raw data and then evaluating the conditioned data using a conventional correctness analysis algorithm. The input data for the analyses can therefore be obtained without intervening in the target system and influencing its runtime behavior. By combining existing algorithms with hardware trace solutions, the solution makes it possible to dynamically analyze correctness without the previously required interventions in the program to be analyzed and meaningful analyses with respect to correctness can therefore be made more easily and more quickly during the development of software in embedded systems, which contributes to increasing the productivity during software testing and results in a higher quality of the software.

7 Claims, 1 Drawing Sheet

(56) References Cited

U.S. PATENT DOCUMENTS

| | | | | |
|---|---|---|---|---|
| 2003/0050725 A1* | 3/2003 | Dirnfeldner | .......... | G05B 19/408 700/174 |
| 2003/0088854 A1* | 5/2003 | Wygodny | ........... | G06F 11/3636 717/130 |
| 2006/0242627 A1* | 10/2006 | Wygodny | ........... | G06F 11/3636 717/128 |
| 2009/0187747 A1 | 7/2009 | Mayer et al. | ................. | 712/227 |
| 2011/0113291 A1* | 5/2011 | Ike | ..................... | G06F 11/3636 714/45 |
| 2012/0226837 A1* | 9/2012 | Cruickshank | ......... | G06F 11/349 710/110 |
| 2015/0046617 A1* | 2/2015 | Shirlen | ................... | G06F 13/36 710/117 |
| 2016/0147653 A1* | 5/2016 | Accapadi | ........... | G06F 11/3636 711/154 |

* cited by examiner

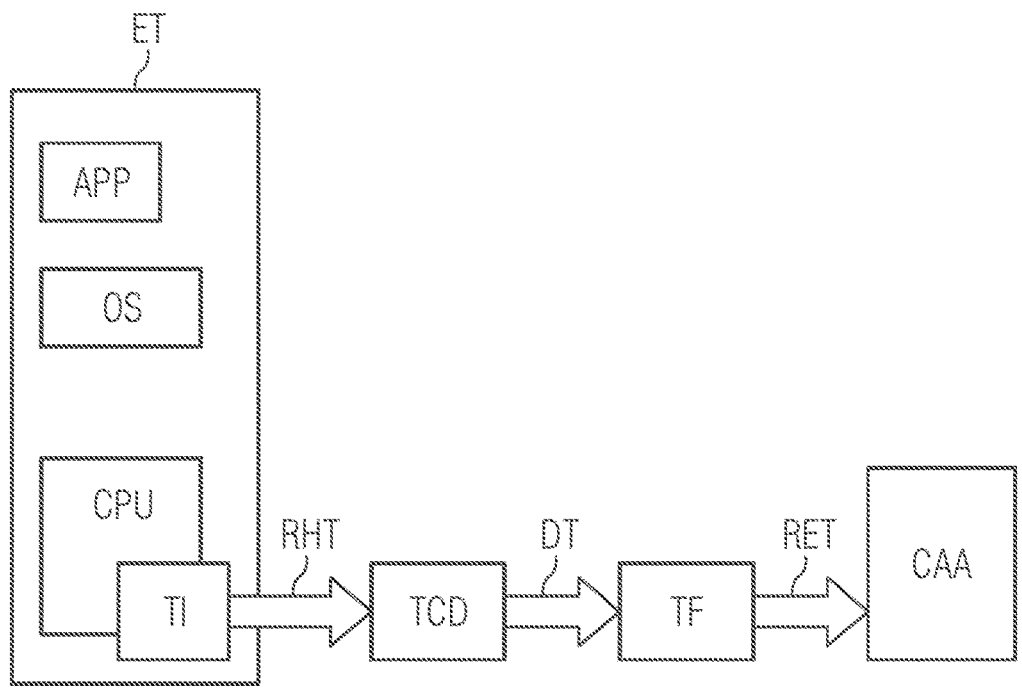

METHOD AND APPARATUS FOR DYNAMICALLY ANALYZING THE CORRECTNESS OF SOFTWARE

CROSS-REFERENCE TO RELATED APPLICATIONS

This application claims priority to DE Application No. 102015217074.8 filed Sep. 7, 2015, the contents of which are hereby incorporated by reference in their entirety.

TECHNICAL FIELD

The invention relates to a method and an apparatus for dynamically analyzing the correctness of software.

BACKGROUND

When developing parallel software or multi-threaded software, it is necessary to ensure correctness, for example with regard to errors such as data races and deadlocks. A common method here is to dynamically analyze a program at the runtime.

Existing tools operate with instrumentation, that is to say the program is changed, which, however, greatly influences both the timing and the storage requirement of the application. This may result in problems, particularly in the embedded field. On the one hand, the limited resources in the target system, for example the main memory, may make an analysis impossible and, on the other hand, the time behavior of the software is often essential, with the result that influence by the instrumentation here prevents the application from being able to be executed properly and an analysis is therefore invalid.

Under certain circumstances, it is possible, to a limited extent, to execute the software on a different platform. However, especially in the embedded environment, software often operates with external input/output devices which are available only on the actual target platform. Execution in a different environment therefore restricts the possibilities of meaningful test cases.

Previous tools for dynamically analyzing correctness operate as pure software solutions and are based on instrumentation of the program code, the instrumentation being effected either statically at the compile time, by means of special compiler plug-ins or modules or dynamically at the execution time. The result of the instrumentation is a change in the target program in such a manner that, if particular events occur, corresponding input data are generated for the analysis algorithm. Relevant events in this case are, for example, read and write memory access operations and function calls, in particular calls of memory management functions and calls of functions with respect to concurrency. In this case, an analysis algorithm uses the events which have occurred and their sequence to discern whether problems such as deadlocks or race conditions can occur in the program. Frequently used algorithms are "lockset" and "happens-before", or else hybrid solutions which combine aspects of both approaches.

The most well-known tools of this type are:
Intel Inspector XE: dynamic instrumentation with PIN, analysis using a hybrid/proprietary algorithm
Helgrind (open source): dynamic instrumentation with the aid of the Valgrind framework, analysis using a happens-before algorithm
Google Thread Sanitizer (open source): static instrumentation by means of compilers, analysis using a hybrid algorithm
Oracle Thread Analyzer: static or dynamic instrumentation, analysis using a hybrid algorithm.

The most important disadvantage of the instrumentation-based solutions is the overhead which arises at the runtime for the analysis. In this case, the execution of the application is slowed down by up to a factor of 50 and the memory usage for the analysis is also sometimes very high with several hundred MB.

There are trace solutions which are able to record program execution in detail by means of hardware support without changing the runtime properties of the target system. In this case, they use special interfaces which are provided by the processors, for example Nexus (in the case of a power architecture) or CoreSight (in the case of an ARM architecture). In order to access this information, a special device is generally needed in order to decode the trace streams from the CPU, supported by software on the host which further processes and conditions the data. These techniques are used in the embedded environment in the field of the debugging of real-time systems. Some of these solutions also already shape the dynamic analysis, but are restricted to profiling and coverage analysis.

SUMMARY

One embodiment provides a method for dynamically analyzing the correctness of software, in which a central processing unit of a target system has a trace interface which provides coded raw data relating to the tracing of the processing unit, and in which the raw data are processed in such a manner that the raw data are initially conditioned and are then evaluated with the aid of a conventional correctness analysis algorithm.

In one embodiment, the raw data are conditioned by collecting and decoding all executed instructions of the operating system and all running application programs and by forming reduced execution trace data therefrom by means of filtering, which reduced execution trace data contain only the memory access operations and function calls for a particular process of interest.

In one embodiment, the raw data are processed offline and in a manner decoupled from the recording.

In one embodiment, the raw data are processed during the runtime.

Another embodiment provides an apparatus for dynamically analyzing the correctness of software, in which there is an embedded target system having at least one application program, an operating system and a central processing unit, in which the processing unit has a trace interface which provides coded raw data relating to the tracing of the processing unit, in which a trace collection device is present such that decoded trace data are formed from the raw data and also comprise the operating system and all running applications, in which a trace filter is present such that reduced execution trace data are formed from the trace data and contain the memory access operations and function calls only for a particular process of interest, and in which there is a unit for carrying out a conventional correctness analysis algorithm which evaluates the execution trace data.

BRIEF DESCRIPTION OF THE DRAWINGS

Example aspects and embodiments of the invention are explained in more detail below with reference to FIG. 1, which shows an example embedded target system and related process flow for dynamically analyzing the correctness of software.

DETAILED DESCRIPTION

Embodiment of the invention specify a method and an apparatus for dynamically analyzing the correctness of software, in which the above-mentioned disadvantages are avoided as far as possible and in which it is possible to dynamically analyze correctness on a target system without influence at the runtime.

Some embodiments provide a method for dynamically analyzing the correctness of software, in which a central processing unit of a target system has a trace interface which provides coded raw data relating to the tracing of the processing unit, and in which the raw data are processed in such a manner that the raw data are initially conditioned and are then evaluated with the aid of a conventional correctness analysis algorithm. The input data for the analyses can therefore be advantageously obtained without intervening in the target system and influencing its runtime behavior. By combining existing algorithms with hardware trace solutions, the solution makes it possible to dynamically analyze correctness without the previously required interventions in the program to be analyzed and meaningful analyses with respect to correctness can therefore be made more easily and more quickly during the development of software in embedded systems, which contributes to increasing the productivity during software testing and results in a higher quality of the software.

FIG. 1 shows an embedded target system ET having an application program APP, an operating system OS and a central processing unit CPU, the processing unit having a trace interface TI which provides coded raw data RHT relating to the tracing of the hardware and supplies them to a trace collection device TCD. The trace collection device TCD provides a trace filter TF (trace filtering) with decoded trace data DT which also comprise the operating system OS and all running applications, for example the application program APP. Reduced execution trace data RET (reduced execution trace), which contain the memory access operations and function calls including the threading API calls for a particular process of interest, are formed by means of the trace filter TF and are supplied to a unit for carrying out a correctness analysis algorithm CAA for evaluation.

The central processing unit CPU of the target system ET has a trace interface TI substantially in hardware form which provides the coded raw data RHT relating to the tracing of the processing unit. These raw data are initially conditioned and are then evaluated with the aid of a conventional correctness analysis algorithm.

The raw data are conditioned by collecting and decoding all executed instructions of the operating system OS and all running application programs APP and by forming the reduced execution trace data RET from the decoded trace data DT produced in this manner by means of filtering TF, which reduced execution trace data contain only the memory access operations and function calls for a particular process of interest.

The data can be evaluated either offline, in a manner decoupled from the recording, or "live" during the runtime if the tracing or the trace infrastructure allows this.

What is claimed is:

1. A method for dynamically analyzing the correctness of an embedded software, the method comprising:
   executing the embedded software with a central processing unit (CPU) of a target system,
   tracing a behavior of the CPU during a runtime of the embedded software with a trace interface comprising hardware of the CPU without influencing a runtime behavior of the target system,
   providing coded raw data relating to the traced behavior of the CPU, and
   processing the coded raw data, including:
      conditioning the coded raw data; and
      evaluating the conditioned coded raw data using a correctness analysis algorithm;
   wherein conditioning the coded raw data includes:
      collecting and decoding executed instructions to generate decoded executed instructions; and
      forming reduced execution trace data by filtering the decoded executed instructions and all running application programs, wherein the reduced execution trace data contain only memory access operations and function calls only for a particular process.

2. The method of claim 1, wherein conditioning the coded raw data further includes:
   collecting and decoding all executed instructions of an operating system and all running application programs.

3. The method of claim 1, wherein the coded raw data are processed offline and decoupled from recording of the coded raw data.

4. The method of claim 1, wherein the coded raw data are processed during runtime.

5. An apparatus for dynamically analyzing the correctness of an embedded software, the apparatus comprising:
   an embedded target system having at least one application program, an operating system, and a central processing unit (CPU),
   wherein the CPU includes a trace interface comprising hardware that provides coded raw data relating to tracing of a runtime behavior of the CPU without influencing a runtime behavior of the embedded target system and a trace collection device that forms decoded trace data from the coded raw data, and wherein the decoded trace data includes the operating system and all running application programs,
   a trace filter that forms reduced execution trace data by filtering the decoded trace data and all running application programs, wherein the reduced execution trace data includes only memory access operations and function calls only for a particular process, and
   an evaluation unit that performs a correctness analysis algorithm to evaluate the reduced execution trace data.

6. The apparatus of claim 5, wherein the coded raw data are processed offline and decoupled from recording of the coded raw data.

7. The apparatus of claim 5, wherein the coded raw data are processed during runtime.

* * * * *